Figure 1:
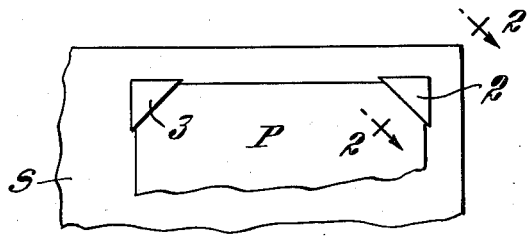

May 14, 1957   C. A. FLOOD   2,791,948
APPARATUS FOR MAKING CORNER MOUNTS
Filed March 12, 1954   7 Sheets-Sheet 1

Inventor
Carl A. Flood
by Roberts, Cushman & Grover
Attys

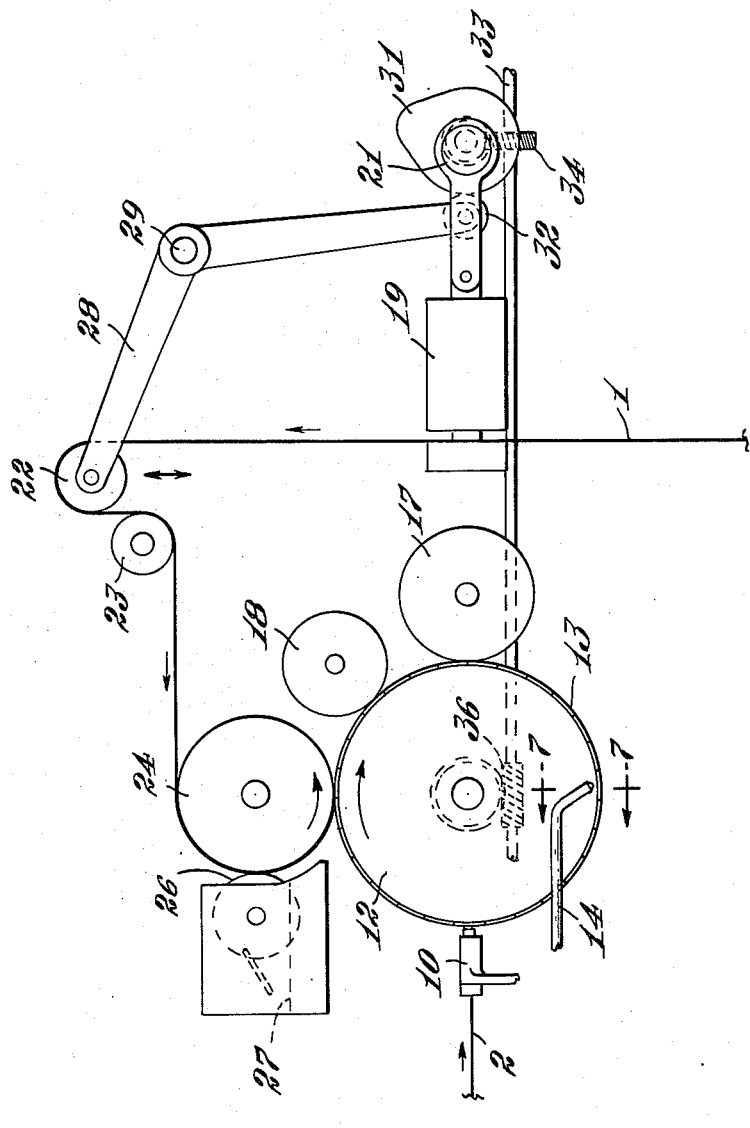
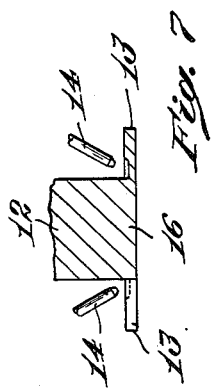
Fig. 6
Fig. 7

Inventor
Carl A. Flood
by Roberts, Cushman & Grover
Attys

May 14, 1957 C. A. FLOOD 2,791,948
APPARATUS FOR MAKING CORNER MOUNTS
Filed March 12, 1954 7 Sheets-Sheet 5
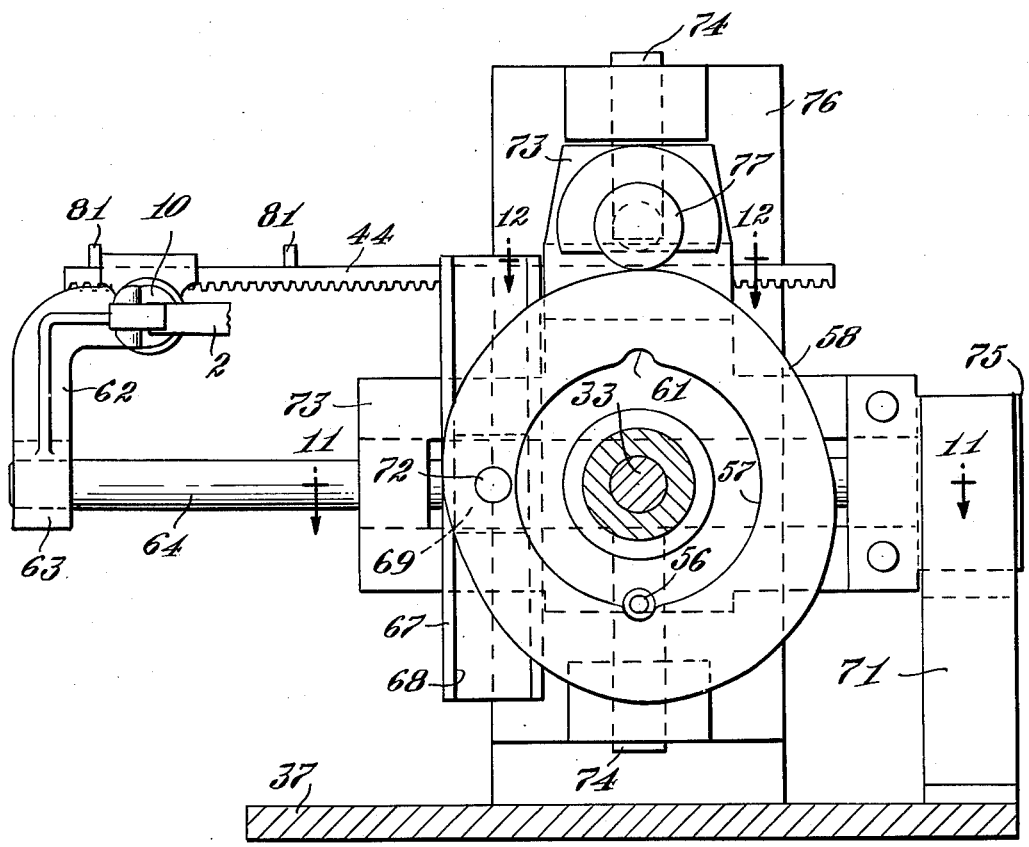
Fig. 10
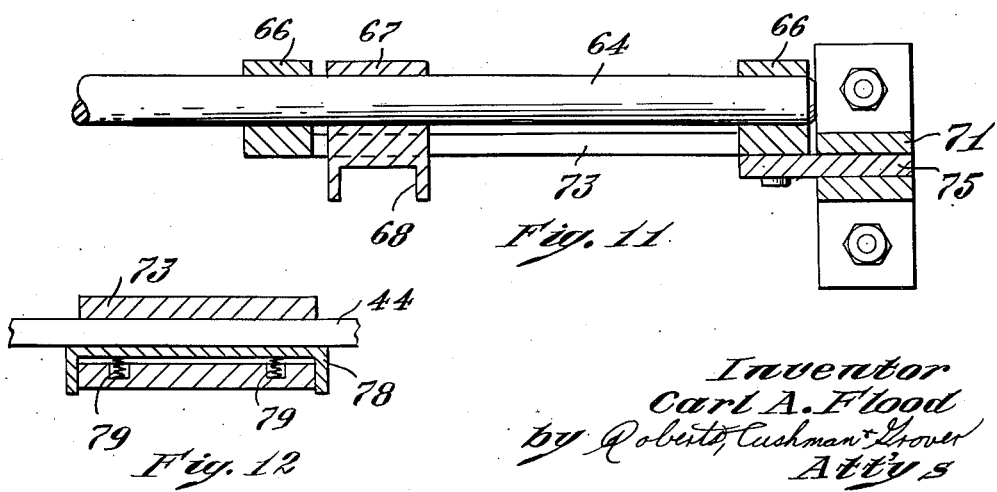
Fig. 11
Fig. 12
Inventor
Carl A. Flood
by Roberts, Cushman & Grover
Attys May 14, 1957  C. A. FLOOD  2,791,948
APPARATUS FOR MAKING CORNER MOUNTS
Filed March 12, 1954  7 Sheets-Sheet 6

Inventor
Carl A. Flood
by Roberts, Cushman & Grover
Atty's

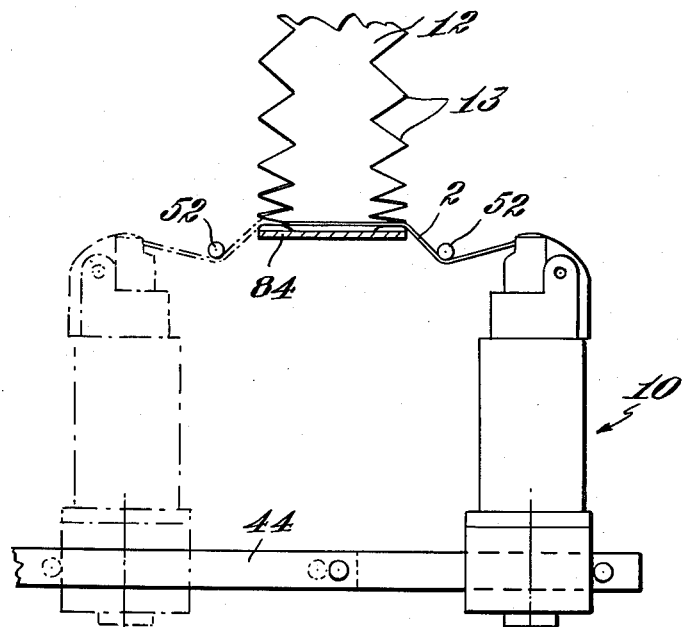

United States Patent Office 2,791,948
Patented May 14, 1957

2,791,948
APPARATUS FOR MAKING CORNER MOUNTS

Carl A. Flood, Framingham, Mass., assignor to Dennison Manufacturing Company, Framingham, Mass., a corporation of Massachusetts Application March 12, 1954, Serial No. 415,909

16 Claims. (Cl. 93—1)

This invention relates to corner mounts adapted to be secured to a surface, usually by gumming backs, the mounts having triangular pockets to receive the corners of photographs and the like.

Objects of the present invention are to provide improved apparatus for making corner mounts which is simple and economical in construction, which is convenient and reliable in use and which produces the mounts rapidly and uniformly. Another object is to produce the mounts in strip form such that they can be dispensed conveniently and applied rapidly.

In one aspect the present invention involves apparatus comprising an elongate support having on each side laterally projecting V-shaped teeth, the teeth on one side being staggered relatively to the teeth on the other side, in combination with means for weaving a ribbon back and forth over the face of the support and under the teeth on the two sides alternately, and means for concomitantly producing relative movement between the support and weaving means lengthwise of the support. While the ribbon may comprise any suitable material, it preferably consists of thin, transparent plastic. Preferably the support has a central zone intermediate the two rows of teeth and in the preferred embodiment is in the form of the periphery of a wheel whose diameter is larger than its width.

In a more specific aspect the weaving means includes a ribbon feeder oscillating transversely of the support in cycles each comprising a stroke in each direction, the ribbon being fed in a plane juxtaposed to the face of the support and the feeder travelling beyond the teeth at the ends of each cycle, and means for turning the feeder about an axis extending transversely of said plane through 180° in one direction during the ends of the cycles at one side of the support and 180° in the opposite direction during the ends of the cycles at the other side of the support to form loops engageable under the teeth. To start the loops in the right direction at the ends of the cycles a spurt of air or other means are preferably provided to engage the ribbon intermediate the support and feeder during the ends of each cycle, preferably at the beginning of each stroke, to start the aforesaid loops.

In the preferred embodiment the apparatus also comprises means for applying a backing to the support over the ribbon after it has been folded as aforesaid, together with means for severing the ribbon and backing intermediate the rows of teeth so that the pockets formed over the teeth may be removed laterally from opposite sides of the support.

In another aspect the invention involves a strip of corner mounts comprising a backing strip having a connecting zone extending lengthwise of the strip and having one side margin notched to form V-shaped teeth whose edges form substantially right angles, with pockets secured to the front of the teeth respectively, each pocket consisting of a piece of ribbon having its central portion extending lengthwise of the backing strip across one tooth with its end portions folded along said edges between the central portion and the tooth and thence crosswise of the strip. Preferably the backing strip has weakened lines extending crosswise of the strip from the bottoms of the aforesaid notches to facilitate separation of the corner mounts from the strip. In the preferred embodiment the aforesaid connecting zone extends along a straight path lengthwise of the strip, in contradistinction to a zig-zag path or a path curving back and forth.

Figure 2:
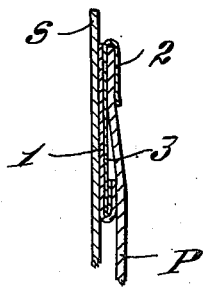
Figure 3:
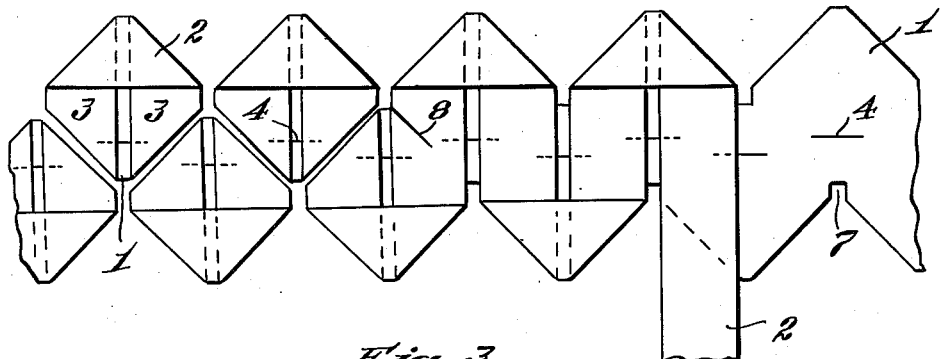
Figure 4:
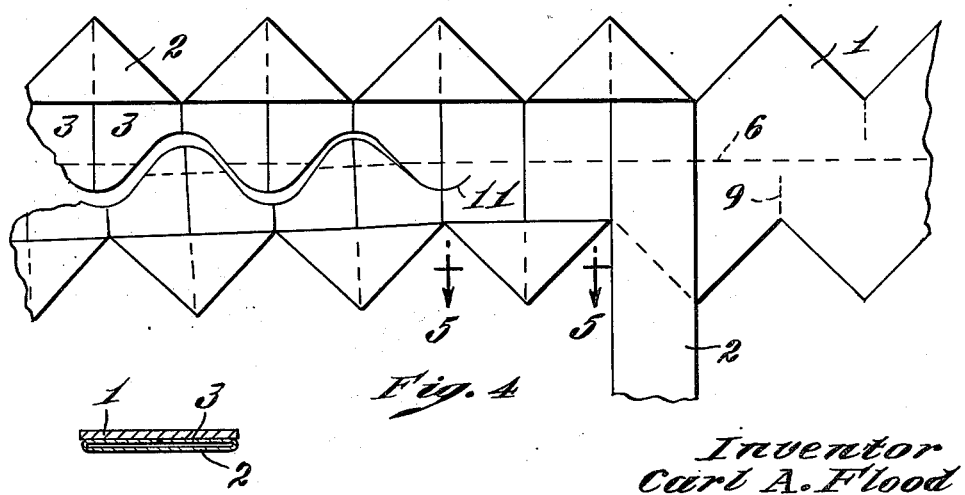
Figure 5:
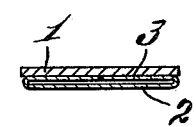
Figure 8:
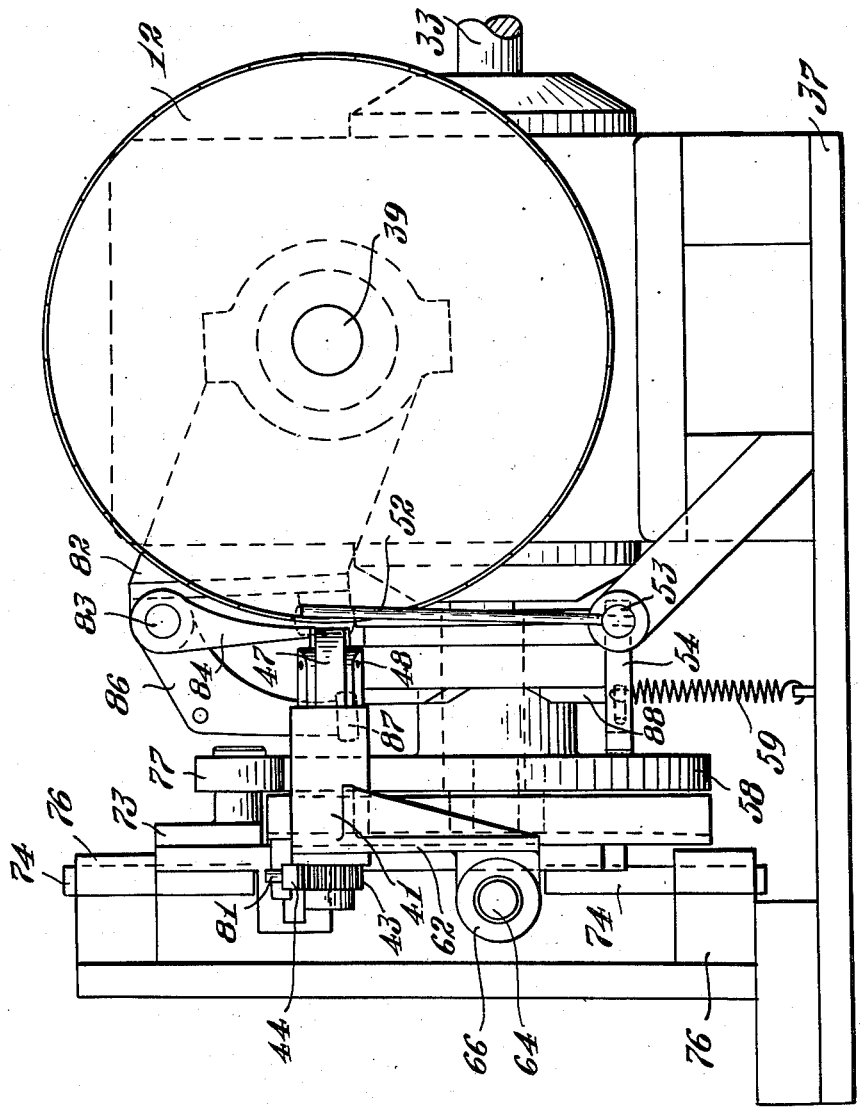
Figure 9:
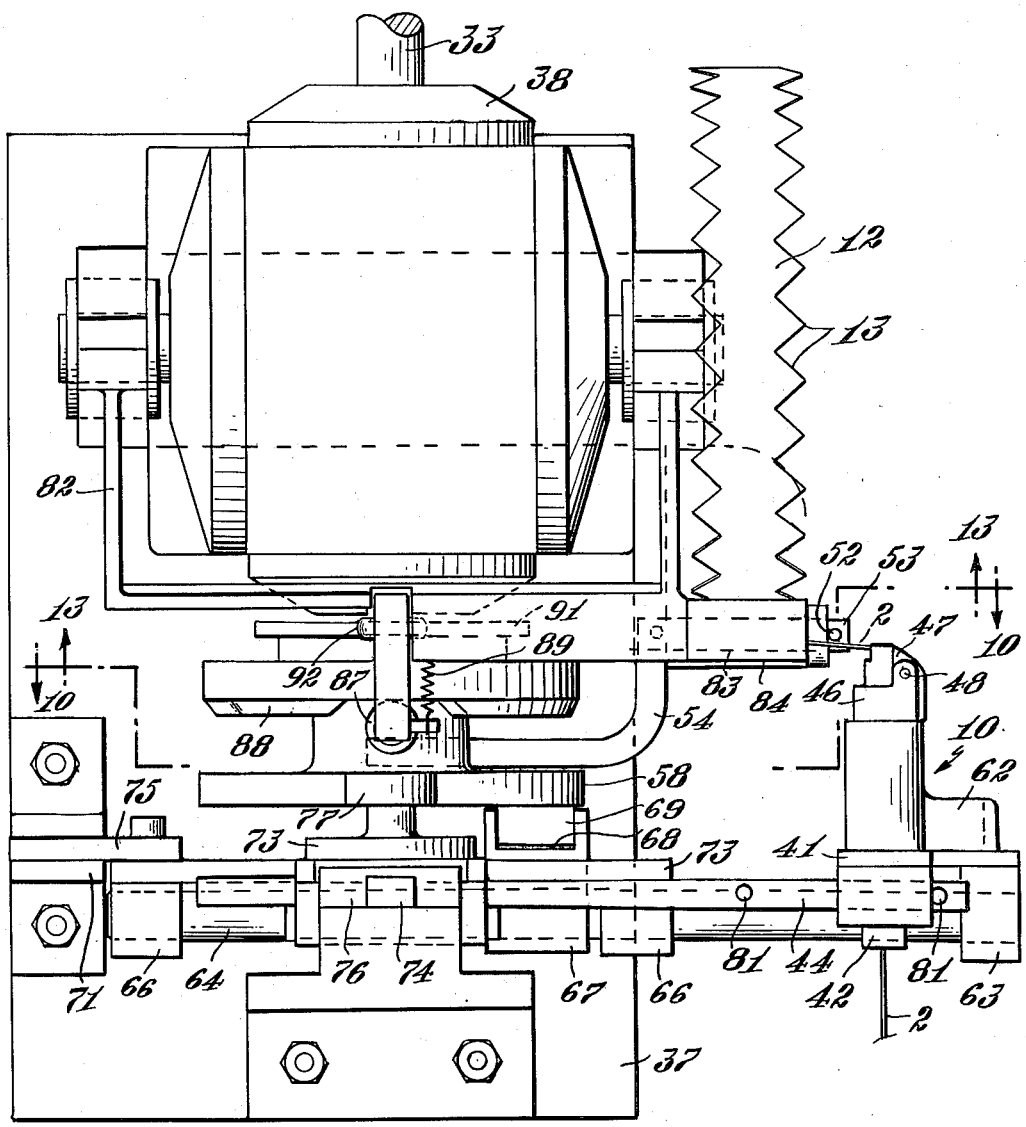
Figure 13:
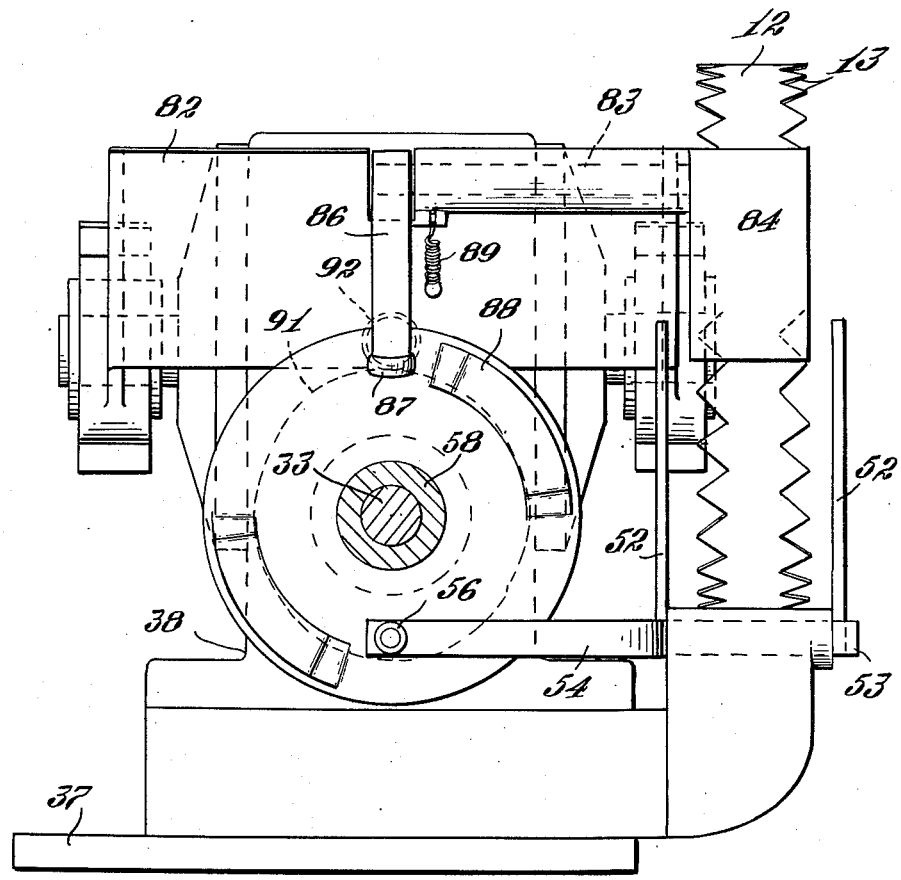
Figure 14:
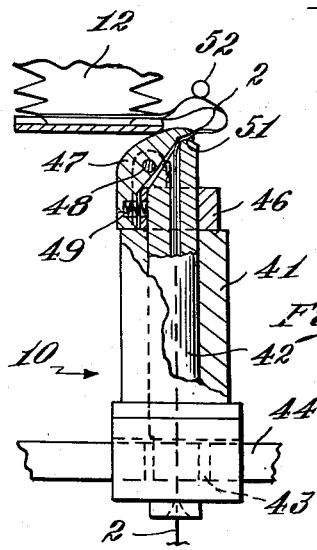

For the purpose of illustration typical embodiments of the invention are shown in the accompanying drawings in which:

Fig. 1 illustrates the use of the corner mounts;
Fig. 2 is a section on line 2—2 of Fig. 1;
Fig. 3 is a plan view of a strip of corner mounts illustrating one method of manufacture;
Fig. 4 is a similar view illustrating a modified method of manufacture;
Fig. 5 is a section on line 5—5 of Fig. 4;
Fig. 6 is a diagrammatic view of a machine for making the mounts;
Fig. 7 is a section on line 7—7 of Fig. 6;
Fig. 8 is a front view of the ribbon feeding mechanism;
Fig. 9 is a plan view of this mechanism;
Fig. 10 is a section on line 10—10 of Fig. 9;
Fig. 11 is a section on line 11—11 of Fig. 10;
Fig. 12 is a section on line 12—12 of Fig. 10;
Fig. 13 is a section on line 13—13 of Fig. 9;
Fig. 14 is a plan view of the ribbon feeder showing it turned 180° from the position shown in Fig. 9; and
Fig. 15 is a plan view of the ribbon feeding mechanism with legends showing the sequence of operations.

As shown in Figs. 1 and 2 the mounts may be used to attach a photograph P to a sheet S. Each mount comprises a backing 1 of paper or the like and, cemented to the front of the backing, a pocket 2 which is preferably formed of cellophane or other transparent material. As shown in Fig. 3 each pocket is formed of a length of ribbon 2 having its central portion extending across the outer corner of the backing 1 and its end portions 3 folded under the central portion. The rear face of the backing 1 is usually gummed for convenient attachment to a sheet such as shown at S and the inner corner of the mount may be folded outwardly as shown in Fig. 2 so as to be attached to the photograph P in similar manner. To facilitate the folding of the inner corner, at the fold line the backing may be provided with a cut such as shown at 4 in Fig. 4 or a score line such as shown at 6 in Fig. 4.

Before the ribbon 2 is attached to the backing 1 the ribbon is folded back and forth and held in folded position until the backing is applied. Also the backing strip is preferably cut to shape before it is attached to the ribbon material. As shown in Fig. 3 the backing strip has a row of 90° teeth along each margin, the teeth on one margin being staggered with relation to the teeth on the other margin, and between the bases of adjacent teeth are U-shaped notches 7. As shown in Fig. 3 the distance between succeeding notches is approximately equal to twice the width of the ribbon 2 and in folding the ribbon the central portions 2 of succeeding mounts are spaced apart a distance equal to the width of a notch. After the folded ribbon and backing have been secured together the mounts are cut apart along the zig-zag line 8.

In the modification shown in Fig. 4 the notches 7 are replaced by weakened lines 9 which may comprise perforations or score lines, and in folding the ribbon back and forth no space is left between the ends 3 of the ribbon, and instead of cutting the strip along a zig-zag line it is cut along a wavy line 11. By substituting the weakened lines 9 for the notches 7 the mounts of each marginal row remain connected together when the strip is severed down the middle. Thus the mounts may be distributed in strips or rows to be torn apart at the time of use.

It will be understood that the wavy cut 11 may be substituted for the zig-zag cut 8 in the first embodiment and in the modification the zig-zag cut of Fig. 3 may be substituted for the wavy cut of Fig. 4.

In the machine diagrammatically illustrated in Fig. 6 the backing material 1 is fed upwardly from the bottom and the ribbon 2 is fed in from the left. The ribbon material is applied to the periphery of a wheel 12 whose periphery has marginal teeth 13 corresponding to the aforesaid teeth on the backing material (Figs. 9, 13 and 15) by a feeder 10. As the wheel rotates the ribbon is folded back and forth under a tooth on one side thence across the periphery of the wheel, thence under the next tooth on the other side, thence across the periphery of the wheel, and so on.

Nozzles 14 may be provided to direct air jets into recesses 16 in the backs of the teeth to assist in removing the corner mounts from the wheel after the strip has been cut down the middle as illustrated in Figs. 3 and 4. These cuts may be made by means of a cutting wheel 17 having either a zig-zag or wavy cutter on its periphery. If a weakened line is to be provided, as illustrated at 6 in Fig. 4, it may be applied to the strip by means of a scoring wheel 18. As shown in Fig. 6 the backing strip may be cut to the shape shown in either Fig. 3 or Fig. 4 by means of a cutter 19 reciprocated back and forth by means of an eccentric 21. After passing the cutter the backing strip passes over roller 22 thence under roller 23 and thence over roller 24 where it receives a coating of adhesive from an applicator roll 26 dipping into a pool of adhesive 27. Inasmuch as the backing strip 1 feeds intermittently past the cutter 19 and is fed continuously to the wheel 12, the roller 22 is reciprocated up and down in synchronism with the cutter, moving down while the cutter is operating on the strip and then moving upwardly to advance the strip one step, the roller being reciprocated by means of a crank arm 28 swinging on a stationary pivot 29 and operated by a cam 31 acting on a cam follower 32 journaled on the lower end of the crank arm. The parts may be operated in synchronism in any suitable way as for example through a shaft 33 and gears 34 and 36.

The mechanism for applying the ribbon 2 to the wheel 12, which is illustrated in Figs. 8 to 15 inclusive, comprises a base 37 carrying a gear reduction unit 38 driven by shaft 33, the aforesaid toothed wheel 12 being mounted on a shaft 39 which is rotated continuously by the speed reducing gears. As shown in Fig. 14 the ribbon feeder 10 comprises a tubular portion 41 in which is journaled a shaft 42. At its outer end the shaft carries a pinion 43 meshing with the rack 44 for turning the shaft, and at its inner end it has a head 46 in which is mounted a friction shoe 47, the shoe being pivoted on a pin 48 and pressed in a clockwise direction (Fig. 14) by means of a spring 49. The tip of the shoe has a flat surface seating on the flat end 51 of the head 46. Extending lengthwise through the shaft 42 is a slot for the ribbon 2, the slot emerging at the inner end adjacent the flat surface 51. Thus the tip of the shoe presses the ribbon against the flat surface 51 and applies friction to the ribbon as the ribbon is pulled out of the feeder.

As illustrated in Fig. 15 the feeder 10 reciprocates back and forth from one side of the wheel 12 to the other and at each end of each cycle it is rotated so that the outlet of the feeder turns upwardly and outwardly through 180°, thereby to form a loop to fold over the next tooth 13. To start the loop in the right direction the ribbon is tapped on the side next to the wheel by a finger 52 at approximately the moment when the feeder 10 starts a new stroke.

The fingers 52 are mounted on a shaft 53 on the inner end of which is fastened an arm 54 carrying on its outer end a cam follower 56 bearing on a cam surface 57 on the inner side of the cam wheel 58 (Fig. 10). The follower 56 is held against the cam 57 by means of a spring 59 and the cam 57 has depressions 61 to receive the follower 56 at the beginning of the strokes of the feeder 10, thereby to cause the fingers 52 to tap the ribbon momentarily as illustrated in Fig. 15.

The feeder 10 is mounted on a bracket 62 having on its lower end a boss 63 which is fast to a rod 64 slidable back and forth in bearings 66 (Figs. 10 and 11). Fast to the rod between the two bearings is an elongate follower 67 having a groove 68 (Figs. 10 and 11) to receive a block 69 pivotally mounted on cam disk 71 by means of a pin 72. Thus as the disk 58 rotates the block 69 slides up and down in the groove 68 and the follower 67 moves back and forth between the position shown in Fig. 11 and a corresponding position adjacent the other bearing 66.

The bearings 66 are fast to a vertically reciprocating head 73 which has parts 74 and 75 vertically slidable in stationary guides 76 and 77. Pivotally mounted on the inside of the head 73 is a cam follower 77 bearing on the outer periphery of the cam 58. Thus the ribbon feeder moves back and forth across the wheel 10 as the rod 64 slides back and forth in the bearings 66 and at the same time the ribbon feeder moves up and down as the frame 73 is raised and lowered by the cam 58.

The rack 44 slides back and forth in the head 73 and its movement is frictionally resisted by a brake shoe 78 pressed against it by springs 79 (Fig. 12). Projecting from the upper side of the rack 44 are two pins 81 on opposite sides of the feeder head 41, the feeder moving the rack back and forth against the frictional resistance of the brake shoe by engagement with the pin 81. These pins are so spaced that, at the beginning of each stroke of the feeder while it is moving from the end of its stroke to the wheel 12, it slides on the rack from one pin 81 to the other, thereby turning the feeder head 180° by virtue of the engagement of the pinion 43 with the rack. After the feeder moves from one pin to the other is pushes the rack against the frictional resistance of the brake shoe without further rotation of the feeder head 46. At the other end of each cycle the action is reversed, but each time the feeder head 46 rotates upwardly and outwardly.

Swinging on the shaft 39 is a U-shaped frame 82 in the upper part of which is journaled a shaft 83. Fast to the front end of the shaft is a presser 84 for pressing each lap of the ribbon 2 against the periphery of the wheel 12 and at the inner end of the shaft 83 is an arm 86 carrying at its lower end a cam follower 87 which is held against the face of cam 88 by spring 89. The U-shaped support 82 is swung up and down by means of a cam 91 engaging a cam follower 92 pivoted on the swinging bracket 82.

From the foregoing it will be understood that the various movements are as indicated in Fig. 15. The feeder 10 is moved back and forth across the wheel 12 by the block 69 on disk 58 which slides in the groove 68 of the part 67 fast to the rod 64 on which is mounted the ribbon feeder. At the beginning of each stroke one of the fingers 52 taps the ribbon as shown in Fig. 15 to start the new loop in the right direction. As the feeder moves from the end of its stroke to the wheel 12 it slides on the rack 44 from one pin 81 to the other and turns 180° upwardly and outwardly to form a loop which hooks over the next tooth 13 on the wheel 12. As the feeder moves across the face of the wheel 12 it also moves upwardly so as to keep abreast of the constantly rotating wheel. As indicated in Fig. 15 this movement continues to the end of the stroke and at the beginning of the next stroke it quickly drops to the lower level so as to be ready to rise again as it crosses the wheel in the reverse direction. This movement is effected by the cam 58 acting on the follower 77 which is pivoted to the head 73 which slides up and down in the stationary guide 76.

After a loop of ribbon has been laid across the face of the wheel 12 and before the feeder 10 starts a new stroke the holder 84 presses the new lap against the periphery of the wheel to hold it in place while the next loop is being formed. This movement is controlled by the cam follower 87, cam 88 and spring 89. While the holder 84 is pressing the ribbon against the wheel it also follows the constantly rotating wheel, returning quickly to its lower position in the latter portion of each stroke. This up and down movement of the holder is controlled by the cam 91 and the cam follower 92 pivotally mounted on the swinging bracket 82.

It should be understood that the present disclosure is for the purpose of illustration only and that this invention includes all modifications and equivalents which fall within the scope of the appended claims.

I claim:

1. Apparatus for making corner pockets comprising an elongate support having on each side laterally projecting V-shaped teeth, the teeth on one side being staggered relatively to the teeth on the other side, means for weaving a ribbon back and forth over the face of the support and under the teeth on said sides alternately, and means for concomitantly producing relative movement between said support and weaving means lengthwise of the support.

2. Apparatus for making corner pockets comprising a wheel having on each side a row of laterally projecting V-shaped teeth, the teeth of one row being staggered relatively to the teeth of the other row, means for weaving a ribbon back and forth over the peripheral face of the wheel and under the teeth of said rows alternately, and means for concomitantly producing relative movement between the wheel and weaving means circumferentially of the wheel.

3. Apparatus for making corner pockets comprising a support having an elongate central zone bordered on each side by laterally projecting V-shaped teeth, the teeth on one side being staggered relatively to the teeth on the other side, means for weaving a ribbon back and forth over said zone and under the teeth on said sides alternately, and means for concomitantly producing relative movement between said support and weaving means lengthwise of said zone.

4. Apparatus for making corner pockets comprising a wheel having a circumferential central zone bordered on each side by laterally projecting V-shaped teeth, the teeth on one side being staggered relatively to the teeth on the other side, means for weaving a ribbon back and forth over said zone and under the teeth on said sides alternately, and means for concomitantly producing relative movement between the wheel and weaving means circumferentially of the wheel.

5. Apparatus for making corner pockets comprising an elongate support having on each side laterally projecting V-shaped teeth, the teeth on one side being staggered relatively to the teeth on the other side, means for weaving a ribbon back and forth in a plane juxtaposed to the face of the support and under the teeth on said sides alternately, and means for concomitantly producing relative movement between said support and weaving means lengthwise of the support, the weaving means including a ribbon feeder oscillating transversely of the support in cycles each comprising a stroke in each direction, the feeder travelling beyond the teeth at the ends of each cycle, and means for turning the feeder about an axis extending transversely of said plane through 180° in one direction during the ends of the cycles at one side of the support and 180° in the opposite direction during the ends of the cycles at the other side of the support to form loops engageable under the teeth.

6. Apparatus for making corner pockets comprising a wheel having on each side a row of laterally projecting V-shaped teeth, the teeth of one row being staggered relatively to the teeth of the other row, means for weaving a ribbon back and forth in a plane tangent to the periphery of the wheel and under the teeth of said rows alternately, and means for concomitantly producing relative movement between the wheel and weaving means circumferentially of the wheel, the weaving means including a ribbon feeder oscillating transversely of the support in cycles each comprising a stroke in each direction, the feeder travelling beyond the teeth at the ends of each cycle, and means for turning the feeder about an axis extending transversely of said plane through 180° in one direction during the ends of the cycles at one side of the support and 180° in the opposite direction during the ends of the cycles at the other side of the support to form loops engageable under the teeth.

7. Apparatus for making corner pockets comprising a support having an elongate central zone bordered on each side by laterally projecting V-shaped teeth, the teeth on one side being staggered relatively to the teeth on the other side, means for weaving a ribbon back and forth in a plane juxtaposed to said zone and under the teeth on said sides alternately, and means for concomitantly producing relative movement between said support and weaving means lengthwise of said zone, the weaving means including a ribbon feeder oscillating transversely of the support in cycles each comprising a stroke in each direction, the feeder travelling beyond the teeth at the ends of each cycle, and means for turning the feeder about an axis extending transversely of said plane through 180° in one direction during the ends of the cycles at one side of the support and 180° in the opposite direction during the ends of the cycles at the other side of the support to form loops engageable under the teeth.

8. Apparatus for making corner pockets comprising a wheel having a peripheral zone bordered on each side by laterally projecting V-shaped teeth, the teeth on one side being staggered relatively to the teeth on the other side, means for weaving a ribbon back and forth in a plane juxtaposed to said zone and under the teeth on said sides alternately, and means for concomitantly producing relative movement between the wheel and weaving means circumferentially of the wheel, the weaving means including a ribbon feeder oscillating transversely of the support in cycles each comprising a stroke in each direction, the feeder travelling beyond the teeth at the ends of each cycle, and means for turning the feeder about an axis extending transversely of said plane through 180° in one direction during the ends of the cycles at one side of the support and 180° in the opposite direction during the ends of the cycles at the other side of the support to form loops engageable under the teeth.

9. Apparatus for making corner pockets comprising an elongate support having on each side laterally projecting V-shaped teeth, the teeth on one side being staggered relatively to the teeth on the other side, means for weaving a ribbon back and forth in a plane juxtaposed to the face of the support and under the teeth on said sides alternately, and means for concomitantly producing relative movement between said support and weaving means lengthwise of the support, the weaving means including a ribbon feeder oscillating transversely of the support in cycles each comprising a stroke in each direction, the feeder travelling beyond the teeth at the ends of the cycle, means engageable with the ribbon intermediate the support and feeder during the end of each cycle to start a loop engageable under the next tooth, and means for turning the feeder about an axis extending transversely of said plane through 180° in one direction during the ends of the cycles at one side of the support and 180° in the opposite direction during the ends of the cycles at the other side of the support to complete said loops.

10. Apparatus for making corner pockets comprising a wheel having on each side a row of laterally projecting V-shaped teeth, the teeth of one row being staggered relatively to the teeth of the other row, means for weaving a ribbon back and forth in a plane tangent to the periphery of the wheel and under the teeth of said rows alternately, and means for concomitantly producing relative movement between the wheel and weaving means circumferentially of the wheel, the weaving means including a ribbon feeder oscillating transversely of the support in cycles each comprising a stroke in each direction, the feeder travelling beyond the teeth at the ends of the cycle, means engageable with the ribbon intermediate the support and feeder during the end of each cycle to start a loop engageable under the next tooth, and means for turning the feeder about an axis extending transversely of said plane through 180° in one direction during the ends of the cycles at one side of the support and 180° in the opposite direction during the ends of the cycles at the other side of the support to complete said loops.

11. Apparatus for making corner pockets comprising a support having an elongate central zone bordered on each side by laterally projecting V-shaped teeth, the teeth on one side being staggered relatively to the teeth on the other side, means for weaving a ribbon back and forth in a plane juxtaposed to said zone and under the teeth on said sides alternately, and means for concomitantly producing relative movement between said support and weaving means lengthwise of said zone, the weaving means including a ribbon feeder oscillating transversely of the support in cycles each comprising a stroke in each direction, the feeder travelling beyond the teeth at the ends of the cycle, means engageable with the ribbon intermediate the support and feeder at the beginning of each stroke to start a loop engageable under the next tooth, and means for turning the feeder about an axis extending transversely of said plane through 180° in one direction during the ends of the cycles at one side of the support and 180° in the opposite direction during the ends of the cycles at the other side of the support to complete said loops.

12. Apparatus for making corner pockets comprising a wheel having a peripheral zone bordered on each side by laterally projecting V-shaped teeth, the teeth on one side being staggered relatively to the teeth on the other side, means for weaving a ribbon back and forth in a plane tangent to said zone and under the teeth on said sides alternately, and means for concomitantly producing relative movement between the wheel and weaving means circumferentially of the wheel, the weaving means including a ribbon feeder oscillating transversely of the support in cycles each comprising a stroke in each direction, the feeder travelling beyond the teeth at the ends of the cycle, means engageable with the ribbon intermediate the support and feeder during the end of each cycle to start a loop engageable under the next tooth, and means for turning the feeder about an axis extending transversely of said plane through 180° in one direction during the ends of the cycles at one side of the support and 180° in the opposite direction during the ends of the cycles at the other side of the support to complete the loops.

13. Apparatus for making corner pockets comprising an elongate support having on each side a row of laterally projecting V-shaped teeth, the teeth of one row being staggered relatively to the teeth of the other row, means for weaving a ribbon back and forth over the face of the support and under the teeth of said rows alternately, means for concomitantly moving the support relatively to the weaving means lengthwise of the support, means for applying a backing to the support over said ribbon, and means for severing the ribbon and backing intermediate said rows so that the pockets formed over the teeth may be removed laterally from opposite sides of the support.

14. Apparatus for making corner pockets comprising a wheel having on each side a row of laterally projecting V-shaped teeth, the teeth of one row being staggered relatively to the teeth of the other row, means for weaving a ribbon back and forth over the periphery of the wheel and under the teeth of said rows alternately, means for concomitantly moving the wheel relatively to the weaving means circumferentially of the wheel, means for applying a backing to the wheel over said ribbon, and means for severing the ribbon and backing intermediate said rows so that the pockets formed over the teeth may be removed laterally from opposite sides of the wheel.

15. Apparatus for making corner pockets comprising a support having an elongate central zone bordered on each side by laterally projecting V-shaped teeth, the teeth on one side being staggered relatively to the teeth on the other side, means for weaving a ribbon back and forth over said zone and under the teeth on said sides alternately, means for concomitantly moving said support relatively to the weaving means lengthwise of said zone, means for applying a backing to said support over said ribbon, and means for severing the ribbon and backing along said zone so that the pockets formed over the teeth may be removed laterally from opposite sides of the support.

16. Apparatus for making corner pockets comprising a wheel having a circumferential central zone bordered on each side by laterally projecting V-shaped teeth, the teeth on one side being staggered relatively to the teeth on the other side, means for weaving a ribbon back and forth over said zone and under the teeth on said sides alternately, means for concomitantly moving the wheel relatively to the weaving means circumferentially of the wheel, means for applying a backing to the wheel over said ribbon, and means for severing the ribbon and backing along said zone so that the pockets formed over the teeth may be removed laterally from opposite sides of the wheel.

References Cited in the file of this patent

UNITED STATES PATENTS

| | | |
|---|---|---|
| 1,627,667 | Riley | May 10, 1927 |
| 1,870,528 | Rado | Aug. 9, 1932 |
| 2,265,147 | Condon | Dec. 9, 1941 |
| 2,575,924 | Miner | Nov. 20, 1951 |

FOREIGN PATENTS

| | | |
|---|---|---|
| 575,353 | Great Britain | Feb. 14, 1946 |